United States Patent
Wang et al.

(10) Patent No.: US 10,976,954 B2
(45) Date of Patent: Apr. 13, 2021

(54) METHOD, DEVICE, AND COMPUTER READABLE STORAGE MEDIUM FOR MANAGING STORAGE SYSTEM

(71) Applicant: EMC IP Holding Company LLC, Hopkinton, MA (US)

(72) Inventors: Hao Wang, Chengdu (CN); Yang Zhang, Chengdu (CN); Junfeng Wu, Chengdu (CN); Jiang Tan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/579,987

(22) Filed: Sep. 24, 2019

(65) Prior Publication Data

US 2020/0133560 A1  Apr. 30, 2020

(30) Foreign Application Priority Data

Oct. 30, 2018 (CN) .......................... 201811280009.7

(51) Int. Cl.
*G06F 3/06* (2006.01)
(52) U.S. Cl.
CPC .......... *G06F 3/0652* (2013.01); *G06F 3/0604* (2013.01); *G06F 3/0673* (2013.01)
(58) Field of Classification Search
CPC .... G06F 3/0604; G06F 3/0608; G06F 3/0652; G06F 3/0671; G06F 3/0673; G06F 11/1448
See application file for complete search history.

(56) References Cited

U.S. PATENT DOCUMENTS

| 8,032,498 | B1* | 10/2011 | Armangau | G06F 16/128 |
| | | | | 707/690 |
| 8,949,187 | B1* | 2/2015 | Satish | G06F 11/1461 |
| | | | | 707/640 |
| 2009/0276593 | A1* | 11/2009 | Jacobson | G06F 3/065 |
| | | | | 711/162 |
| 2009/0300303 | A1* | 12/2009 | Balasubramanian | |
| | | | | G06F 11/1448 |
| | | | | 711/162 |
| 2010/0106933 | A1* | 4/2010 | Kamila | H04L 43/16 |
| | | | | 711/171 |
| 2013/0054911 | A1* | 2/2013 | Keller | G06F 12/16 |
| | | | | 711/162 |
| 2014/0258657 | A1* | 9/2014 | Schott | G06F 3/067 |
| | | | | 711/162 |

* cited by examiner

*Primary Examiner* — Larry T Mackall
(74) *Attorney, Agent, or Firm* — BainwoodHuang

(57) ABSTRACT

Techniques involve managing a storage system. Along these lines, for each of a plurality of snapshots, a plurality of blocks referenced by the snapshot is determined. An evaluation score indicating an impact that deletion of the snapshot has on space release and data retention is determined based on at least one of: a reference count for the plurality of blocks, a size of a storage resource associated with the snapshot, and the number of blocks of the plurality of blocks that are referenced only once. At least one snapshot to be deleted is selected from the plurality of snapshots based on respective evaluation scores of the plurality of snapshots.

12 Claims, 5 Drawing Sheets

METHOD, DEVICE, AND COMPUTER READABLE STORAGE MEDIUM FOR MANAGING STORAGE SYSTEM

CROSS-REFERENCE TO RELATED APPLICATION(S)

This application claims priority to Chinese Patent Application No. CN201811280009.7, on file at the China National Intellectual Property Administration (CNIPA), having a filing date of Oct. 30, 2018 and having "METHOD, DEVICE, AND COMPUTER READABLE STORAGE MEDIUM FOR MANAGING STORAGE SYSTEM" as a title, the contents and teachings of which are herein incorporated by reference in their entirety.

FIELD

Embodiments of the present disclosure relate to storage systems, and more specifically to a method, device, and computer-readable storage medium for managing a storage system.

BACKGROUND

A snapshot is a state of a storage system or storage resource at a specific time point. Snapshot auto-deletion allows the snapshot to be automatically deleted when the storage space is approaching its full capacity, thereby releasing the space back to the storage system. The current auto-deletion policy is usually based on the creation time of the snapshot. The storage system allows the user to define a policy of automatically deleting snapshots from the earliest-created snapshot or the most recently created snapshot. However, these policies usually cannot match the user's needs. For example, in some cases, the user expects to release space as much as possible by deleting snapshots as few as possible. In some cases, the user desires to delete the snapshot with the highest degree of block sharing, so that the user might recover data from other snapshots after deleting a snapshot. Therefore, it is necessary to provide an improved solution for managing the storage system.

SUMMARY

Embodiments of the present disclosure provide a method, device, and computer program product for managing a storage system.

In a first aspect, there is provided a method for managing a storage system. The method includes: determining, for each of a plurality of snapshots, a plurality of blocks referenced by the snapshot; determining an evaluation score indicating an impact that deletion of the snapshot has on space release and data retention based on at least one of: a reference count for the plurality of blocks, a size of a storage resource associated with the snapshot, and the number of blocks of the plurality of blocks that are referenced only once; and selecting at least one snapshot to be deleted from the plurality of snapshots based on respective evaluation scores of the plurality of snapshots.

In a second aspect, there is provided an apparatus for managing a storage system. The apparatus includes: a processing unit, a memory coupled to the processing unit and including instructions stored thereon, the instructions, when executed by the processing unit, causing the device to perform acts, the acts including: determining, for each of a plurality of snapshots, a plurality of blocks referenced by the snapshot; determining an evaluation score indicating an impact that deletion of the snapshot has on space release and data retention based on at least one of: a reference count for the plurality of blocks, a size of a storage resource associated with the snapshot, and the number of blocks of the plurality of blocks that are referenced only once; and selecting at least one snapshot to be deleted from the plurality of snapshots based on respective evaluation scores of the plurality of snapshots.

In a third aspect, there is provided a computer-readable storage medium including machine-executable instructions stored thereon which, when executed by at least one processor, cause the at least one processor to perform the method according to the first aspect.

In a fourth aspect, there is provided a computer program product stored on a computer-readable medium and including machine-executable instructions which, when executed, cause a machine to perform the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Figure 1A:
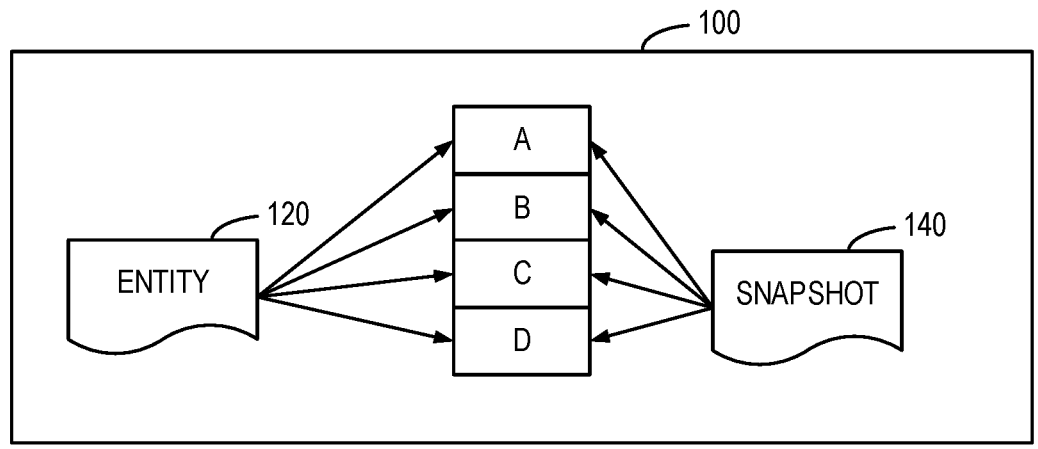
FIG. 1A is a schematic diagram illustrating a storage system according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

Figure 1B:
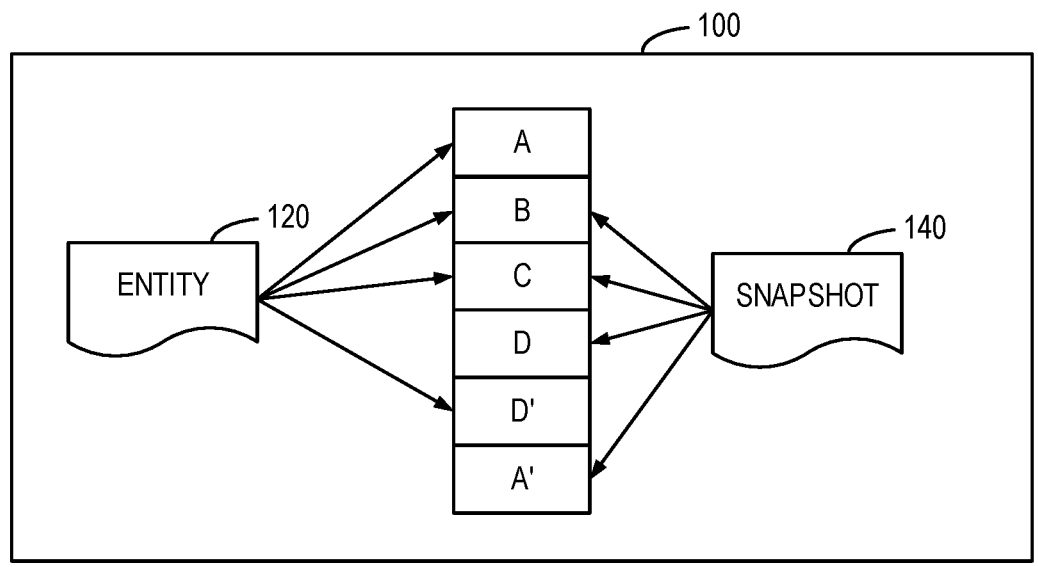
FIG. 1B is a schematic diagram illustrating a storage system according to some embodiments of the present disclosure.

In storage industry, redirect-on-write (ROW) technology is one of the most widely used technologies for implementing snapshot function. The technology uses pointers to represent protected storage entities, and the storage entities may be various storage resources, for example, logic units or file systems. If a block of the storage entity needs modification, the storage system merely redirects the pointer for that block to another block and writes the data on the redirected block. For example, a write operation for a storage resource and its snapshot may be redirected to a new location in the same storage pool, and the pointer is pointed to the new location. FIG. 1A and FIG. 1B show examples of a storage system in accordance with the ROW technique.

As shown in FIG. 1A, an entity 120 may be various storage resources, for example a logical unit or a file system. In this example, the entity 120 includes four data blocks: A, B, C, and D. A snapshot 140 is a snapshot of the entity 120 at a certain time instant, and it points to or references the data blocks A, B, C, and D.

As shown in FIG. 1B, when a host attempts to overwrite the data block D with new data D', the new data D' is written to a new location in the same storage pool, and the entity 120 updates the pointer for the block D to point to D'. The data in the block D is associated with the snapshot 140, so the block D needs to be retained instead of being overwritten, thereby enabling subsequent recovery of the snapshot 140.

Similarly, if the host attempts to overwrite the block A with new data A' while writing data to the snapshot 140, the block A is redirected to a new location A' in the storage pool and the block A is retained. Since the block A is still associated with the entity 120, the block A cannot be overwritten. If the host subsequently attempts to write new data to the block A of the entity 120, the block A can be written without redirection because the block A is no longer associated with the snapshot 140.

Snapshot auto-deletion is an option for the storage system, and it allows the user to define a policy for automatically deleting snapshots to release space back to the storage system when the storage space is nearly full. The auto-deletion starts when a threshold is triggered and automatically stops when another threshold is triggered. The thresholds usually define the free space left on the storage system.

The current auto-deletion policy is usually based on creation time of snapshots. The storage system allows the user to define a policy for automatically deleting snapshots from the earliest-created snapshot or the most recently created snapshot. However, these policies usually cannot match the user's needs. For example, in some cases, the user expects to release space as much as possible by deleting snapshots as few as possible. In some cases, the user desires to delete the snapshot with the highest degree of block sharing, so that the user can recover data from other snapshots after deleting a snapshot.

Figure 2:
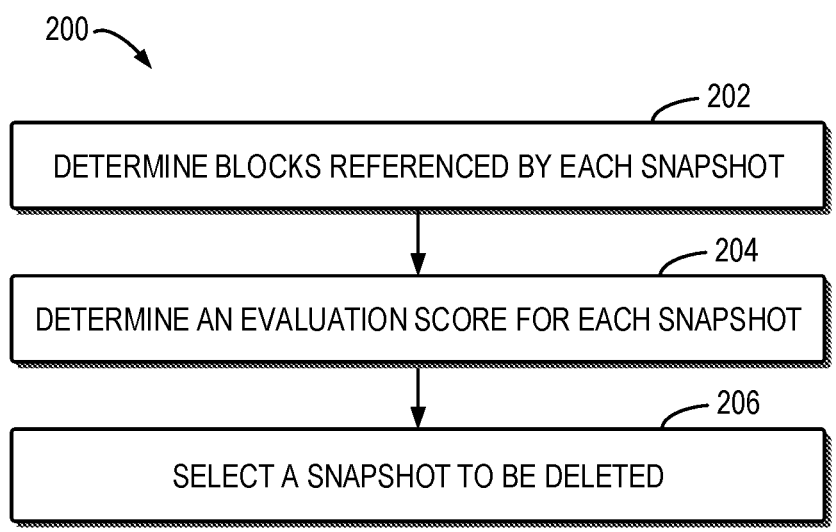
FIG. 2 is a flow chart illustrating a method for managing a storage system according to some embodiments of the present disclosure.

FIG. 2 is a flow chart illustrating a method 200 for managing a storage system according to some embodiments of the present disclosure. Method 200 may be applied to the ROW technique shown in FIG. 1A and FIG. 1B. However, it should be understood that the method 200 may also be applied to any other suitable snapshot technology without departing from the principles and spirit of the present disclosure and the disclosure is not limited herein.

At block 202, for each of a plurality of snapshots, a plurality of blocks referenced by the snapshot are determined. In some embodiments, the plurality of blocks for the snapshot may be determined by sampling the snapshot. In this way, simplification of the processing procedure may be achieved to reduce the need for computing resources. For example, the snapshot may be the snapshot 140 shown in FIG. 1A, and the plurality of blocks may be blocks A, B, C, and D.

At block 204, an evaluation score indicating an impact that deletion of the snapshot has on space release and data retention is determined based on at least one of: a reference count for the plurality of blocks, a size of a storage resource associated with the snapshot and the number of blocks of the plurality of blocks that are referenced only once. As described above, the storage resource may be an entity 120, such as a logical unit or file system, as shown in FIG. 1A. Snapshot 140 is a snapshot of the entity 120 at a certain time. For example, the evaluation score may be defined as being positively correlated with the sum of the reference count for the plurality of blocks, and negatively correlated with the number of the blocks that are referenced only once and the size of the storage resource. In an alternative embodiment, the evaluation score may be defined as being negatively correlated with the sum of the reference count for the plurality of blocks, and positively correlated with the number of the blocks referenced only once and the size of the storage resource.

A storage entity and its snapshots may include a number of blocks, and each block has a reference count that represents the number of pointers pointing from the storage entity and the snapshot to the block. The reference count indicates a rate of usage of the block. If the reference count is greater than or equal to 2, it means that the block is shared by one or more snapshots or entities. Deleting any one of these snapshots will cause the reference count to decrement by one and no storage space release. If the reference count is 1, it means the block is referenced by only one snapshot or entity. If it is referenced by only one snapshot, deleting the snapshot will cause the reference count to decrement to zero, which means that the block is not used by any snapshot or entity and will be released to free the space. Thus the average value of reference count for each block of a snapshot is a key factor.

If the average value of the reference counts for blocks of a snapshot is close to 1, most of the blocks are referenced only once. If this snapshot is deleted, most of blocks may be released, thereby freeing the space. If the average value of the reference counts for the snapshot is larger (e.g., 5), most of the blocks are referenced multiple times. If this snapshot is deleted, most of the blocks cannot be freed. From another perspective, most of the blocks that contain user data will still be retained, and the impact on user data restore reduces. The smaller the average value of the reference counts for a snapshot is, the larger the possibility of deleting the snapshot and causing release of more free space is, the smaller the possibility of user data retention is.

As described above, considering the performance, it is possible to sample a predetermined number of blocks from the snapshot to calculate the average value of the reference count. The sampled blocks are used to evaluate properties of all blocks of the snapshot.

Another factor is the size of the storage resource or storage entity. If two snapshots have a similar average value of reference count but have substantially different sizes, e.g., 100 GB vs. 1 TB, then deletion of snapshot on entity of 1 TB could release about 10 times of space than that on an entity of 100 GB. The larger the storage entity associated with a snapshot is, the larger the possibility of deleting the snapshot and releasing more free space is, the smaller the possibility of user data retention is.

The third factor is the ratio of the blocks that are referenced only once (also referred to as once-referenced blocks) out of all sampled blocks. If two snapshots have similar average value of reference count but the first snapshot has 10% once-referenced blocks and the second snapshot has 30% once-referenced blocks, the space released by deleting the second snapshot is about three times the space released by deleting the first snapshot. In certain cases, if the ratio of once-referenced blocks is 0, the free space release possibility is very low, and the user data retention possibility is very high. In this case, the size of the storage entity has no impact on free space amount. The larger the ratio is, the larger the possibility of deleting the snapshot and releasing more free space is and the smaller the possibility of user data retention is.

In some embodiments, it is possible to combine the three factors, and calculate the evaluation value or evaluation score of each snapshot. However, it should be understood that one or two of the three factors may also be used to calculate the evaluation score, and the disclosure is not limited herein.

At block 206, at least one snapshot to be deleted is selected from the plurality of snapshots based on respective evaluation scores of the plurality of snapshots. For example, if it is determined that a free space first policy is enabled, at least one of the plurality of snapshots having the smallest evaluation score may be determined. If it is determined that the data retention first policy is enabled, at least one of the plurality of snapshots having the largest evaluation score may be determined.

In some embodiments, multiple snapshots may be sorted based on evaluation scores. Based on the snapshots' evaluation scores, two auto-deletion policies may be defined: free space first and data retention first. In free space first policy, it is possible to auto-delete snapshots by an ascending order of evaluation values. In this policy, the snapshot that has greatest possibility for releasing space will be deleted first. In the data retention first policy, it is possible to auto-delete snapshot by a descending order of evaluation values. In this policy, the snapshot that has most shared blocks will be deleted first so that least blocks will be released.

Figure 3:
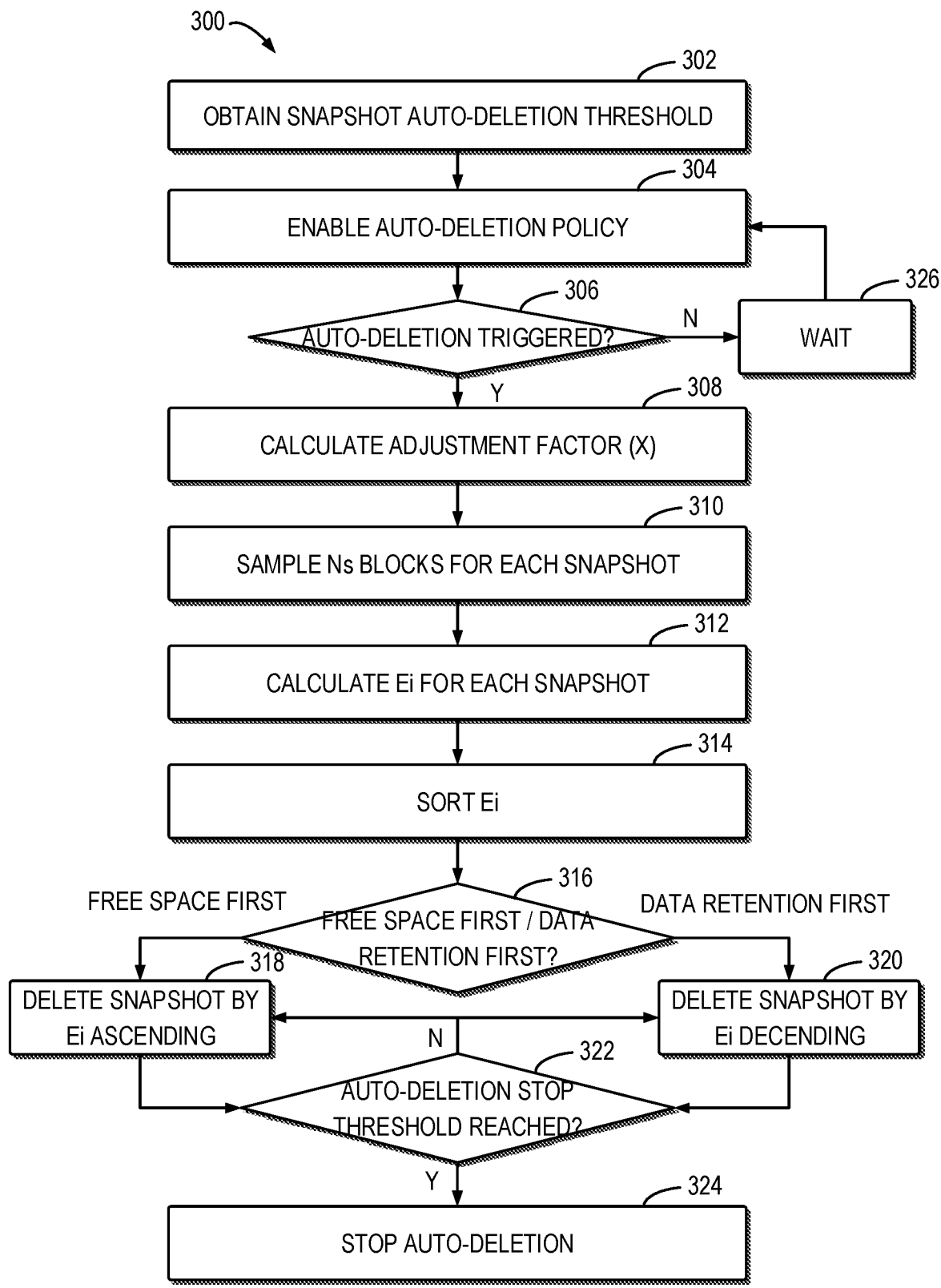
FIG. 3 is a flow chart illustrating a method for managing a storage system according to some embodiments of the present disclosure.

FIG. 3 is a flow chart illustrating a method 300 for managing a storage system according to some embodiments of the present disclosure. It should be appreciated that one or more steps of method 300 may be omitted, substituted and reordered without departing from the principles and spirit of the disclosure.

At block 302, a snapshot auto-deletion threshold is obtained. The snapshot auto-deletion threshold may be set by the user or generated by the system. For example, the snapshot auto-deletion threshold may include a threshold that triggers snapshot auto-deletion and a threshold that stops snapshot auto-deletion. For example, the snapshot auto-deletion threshold may be based on free space remaining on the storage system.

At block 304, an auto-deletion policy is enabled. For example, the auto-deletion policy may be the free space first policy or the data retention first policy.

At block 306, it is determined whether the auto-deletion policy is triggered. If not, the method 300 proceeds to block 326, waits for a predetermined time, and then proceeds to block 304. If it is determined at block 306 that the auto-deletion policy has been triggered, the method 300 proceeds to block 308.

At block 308, an adjustment factor (X) is calculated. For example, the adjustment factor $$X = \frac{\text{Max}\{EntitySize\}}{\text{Min}\{EnitySize\}} \times 110\%,$$

where Max{EntitySize} represents the size of the largest entity, and Min{EntitySize} represents the size of the smallest entity. In addition, 110% is provided as an example only, and another value greater than one or any other suitable value may be used instead.

At block 310, $N_S$ blocks are sampled for each snapshot.

At block 312, an evaluation value or evaluation score Ei for each snapshot i is calculated. For example, the evaluation score may be calculated in the following way.

For example, the first factor may be calculated by $F_A = (\Sigma_{j=1}^{N_S} N_{Aj})/N_S$. $F_A$ represents the average value of the reference count for the sampled blocks of the snapshot; $N_S$ represents the number of sampled blocks; $N_{Aj}$ represents the reference count of the sampled block j of the sample of snapshot i.

The second factor may be calculated by $F_S=1/S_i$. The second factor represents the size of the storage entity. $S_i$ represents the size of the storage entity that snapshot i relies on, and the unit is the size of the largest storage entity.

The third factor may be calculated by $F_R=N_S/N_O$, and the third factor represents the ratio of only-once referenced blocks. $N_O$ represents the number of once-referenced blocks in the sampled blocks.

If the total number of blocks of the snapshot i is N, one block is selected from $N/N_S$ blocks as a sample. The total number of sampled blocks is $N_S$.

If $N_O>0$, the evaluation score $E_i=F_A \times F_S \times F_R=(\Sigma_{J=1}^{N_S} N_{Aj})/S_i N_O$.

If $N_O=0$, set $F_S=1$, $N_O=1$, and use the adjustment factor X to reflect the impact in this case. Evaluation score $$E_i = X \times F_A \times F_S \times F_R = \frac{\text{Max}\{EntitySize\}}{\text{Min}\{EntitySize\}} \times 110\% \left(\sum_{j=1}^{N_s} N_{Aj}\right).$$

At block 314, the evaluation scores Ei are sorted. For example, the evaluation scores Ei may be sorted in ascending or descending order.

At block 316, free space first or data retention first is determined. If the free space first is determined at block 316, the method 300 proceeds to block 318. At block 318, the snapshot is deleted in the order in which the evaluation score Ei is incremented. If the data retention first is determined at block 316, at block 320 the snapshot is deleted in the order in which the evaluation score Ei is decremented.

At block 322, it is determined whether auto-deletion stop threshold is reached. If it is determined at block 322 that the auto-deletion stop threshold is reached, the method 300 proceeds to block 324 to stop the auto-deletion. If it is determined at block 322 that the auto-deletion stop threshold is not reached, method 300 proceeds to block 318 or 320 to continue to delete the snapshot.

It should be understood that the evaluation formula is calculated above in conjunction with a specific calculation formula, but it should be appreciated that another formula may also be used to calculate the evaluation score. For example, in an alternative embodiment, the evaluation score $E_i=1/(F_A \times F_S \times F_R)=S_iN_O/(\Sigma_{j=1}^{N_s} N_{Aj})$. In this case, the adjustment factor X may no longer be used.

Figure 4:
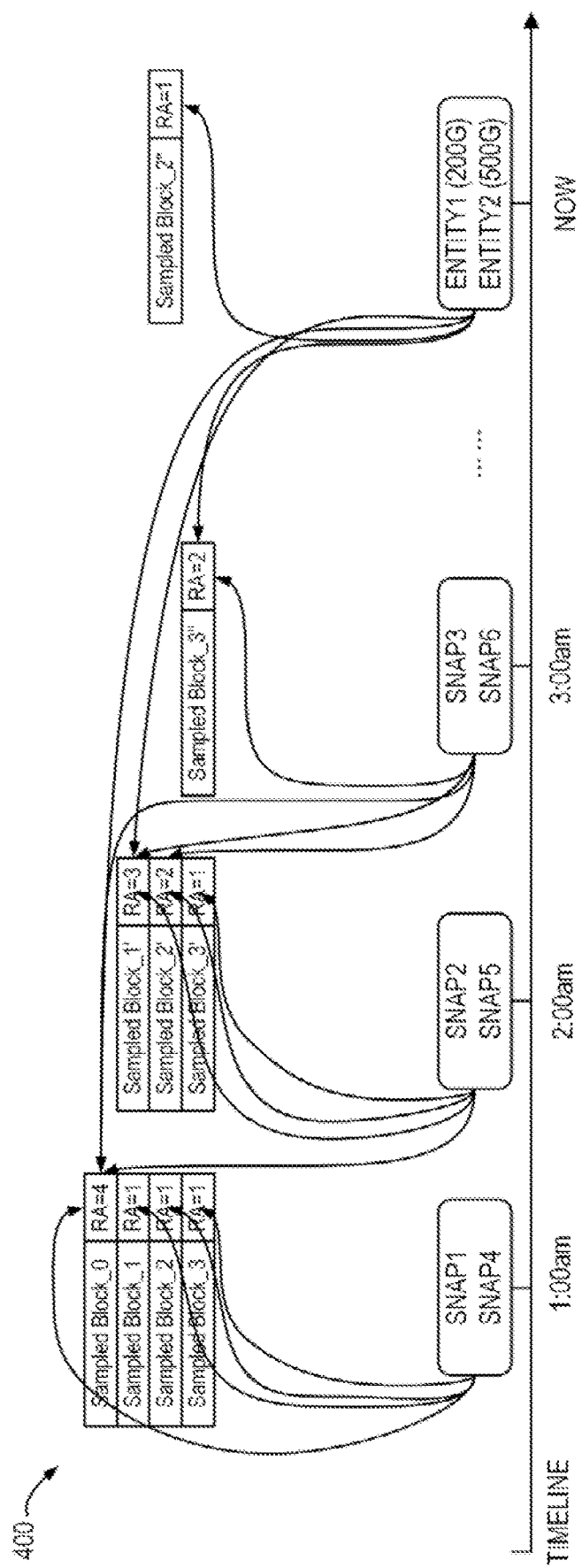
FIG. 4 is a schematic diagram illustrating a method for managing a storage system according to some embodiments of the present disclosure.

FIG. 4 is a schematic diagram illustrating a method 400 for managing a storage system according to some embodiments of the present disclosure. It should be understood that the method 400 is provided by way of example only and does not limit the scope of the disclosure. Method 400 is directed to two storage entities, the size of entity 1 is 200 GB and the size of entity 2 is 500 GB. The auto-deletion policy is now triggered, and each entity has three snapshots at different time (e.g., 1:00 am, 2:00 am, and 3:00 am), as shown in FIG. 4. For simplicity purpose, FIG. 4 only shows the sampled blocks. For comparison purpose, assume that blocks sampled from two storage entities are in the same situation, i.e., the block sampled from snapshot 1 of entity 1 has exactly the same reference count as the block sampled from snapshot 4 of entity 2, and snapshots 2 and 5 and snapshots 3 and 6 also have a similar relationship.

In this example, the number Ns of blocks sampled from each snapshot is set to 4. Adjustment factor X=1010%*500/200=2.75.

As shown in FIG. 4, $S_1=S_2=S_3=$200 GB/500 GB=0.4, and $S_4=S_5=S_6=$500 GB/500 GB=1. Therefore, the evaluation value or evaluation score of each snapshot may be calculated as:

$E_1$=(4+1+1+1)/0.4/3=5.83
$E_2$=(4+3+2+1)/0.4/1=25
$E_3$=2.75*(4+3+2+2)=30.25
$E_4$=(4+1+1+1)/1/3=2.33
$E_5$=(4+3+2+1)/1/1=10
$E_6$=2.75*(4+3+2+2)=30.25

The order of the evaluation score Ei is $E_4<E_1<E_5E_2<E_6=E_3$.

In the free space first policy, snapshot 4 will be deleted first and then snapshot 1 will be deleted. In the data retention first policy, snapshots 3 and 6 will be deleted first. The following discussion is made by taking the free space first policy as an example.

Snapshot 4 has the largest ratio of once-referenced blocks, the smallest average reference count, and the largest size. Therefore, the free space released by deleting snapshot 4 will be the most. Therefore, snapshot 4 will be deleted first.

Snapshot 5 has the same average reference count as snapshot 1 and has a greater size. However, snapshot 5 will be deleted after snapshot 1. This is because the ratio of once-reference blocks of snapshot 1 is much greater than the ratio of once-referenced blocks of snapshot 1. This means that snapshot 1 has greater possibility to release more free space.

If the ratio of the once-referenced blocks of the snapshot is zero, the snapshot should have a lower free space priority than any other snapshots that have a non-zero ratio of once-referenced blocks. If the snapshot is deleted, it is substantially impossible to release free space. Instead, deleting the snapshot will not substantially result in loss of the data block, so it is highly possible that the data therein will be recovered from the other snapshots, even if the snapshot is deleted.

As may be seen from the example illustrated in FIG. 4, the evaluation score may represent an impact that deletion of the snapshot has on space release and data retention, and thus may be well applied to the free space first policy and the data retention first policy.

Figure 5:
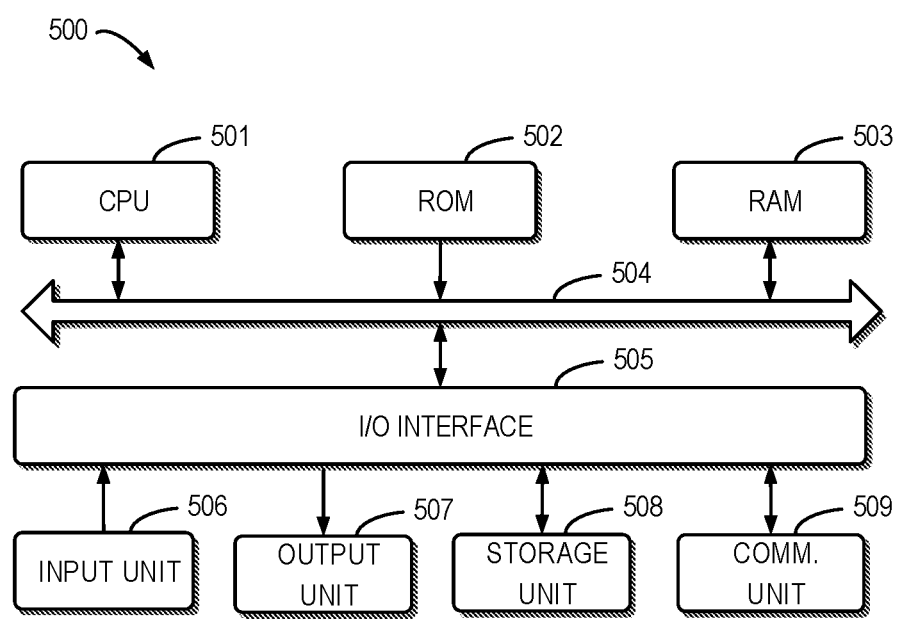
FIG. 5 is a schematic block diagram illustrating an example device that may be used to implement embodiments of the present disclosure.

FIG. 5 illustrates a schematic block diagram of an example device 500 for implementing embodiments of the present disclosure. As shown, the device 500 includes a central process unit (CPU) 501, which can execute various suitable actions and processing based on the computer program instructions stored in the read-only memory (ROM) 502 or computer program instructions loaded in the random-access memory (RAM) 503 from a storage unit 508. The RAM 503 can also store all kinds of programs and data required by the operations of the device 500. CPU 501, ROM 502 and RAM 503 are connected to each other via a bus 504. The input/output (I/O) interface 505 is also connected to the bus 504.

A plurality of components in the device 500 is connected to the I/O interface 505, including: an input unit 506, such as keyboard, mouse and the like; an output unit 507, e.g., various kinds of display and loudspeakers etc.; a storage unit 508, such as magnetic disk and optical disk etc.; and a communication unit 509, such as network card, modem, wireless transceiver and the like. The communication unit 509 allows the device 500 to exchange information/data with other devices via the computer network, such as Internet, and/or various telecommunication networks.

The above described each procedure and processing, such as method 200-400, can also be executed by the processing unit 501. For example, in some embodiments, the method 200-400 can be implemented as a computer software program tangibly included in the machine-readable medium, e.g., storage unit 508. In some embodiments, the computer program can be partially or fully loaded and/or mounted to the device 500 via ROM 502 and/or communication unit 509. When the computer program is loaded to RAM 503 and executed by the CPU 501, one or more steps of the above described method 200-400 can be implemented. Alternatively, in other embodiments, CPU 501 also can be configured in other suitable manners to realize the above procedure/method.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable other ordinary skilled in the art to understand implementations of the present disclosure.

We claim:

1. A method of managing a storage system, comprising:
   determining, for each of a plurality of snapshots, a plurality of blocks referenced by that snapshot;
   determining, for each of the plurality of snapshots, an evaluation score indicating an impact that deletion of that snapshot has on space release and data retention based on at least one of: a reference count for the plurality of blocks referenced by that snapshot, a size of a storage resource associated with that snapshot, and the number of blocks of the plurality of blocks referenced by that snapshot that are referenced only once, wherein the evaluation score of each of the plurality of snapshots is:
   (a) positively correlated with a sum of reference counts for the plurality of blocks referenced by that snapshot and
   (b) negatively correlated with the number of the blocks referenced by that snapshot that are referenced only once and the size of the storage resource associated with that snapshot; and
   selecting at least one snapshot to be deleted from the plurality of snapshots based on respective evaluation scores of the plurality of snapshots.

2. The method of claim 1, wherein determining the plurality of blocks comprises sampling that snapshot to determine the plurality of blocks.

3. The method of claim 1, wherein selecting the at least one snapshot comprises:
   in response to determining that a free space first policy is enabled, determining at least one snapshot of the plurality of snapshots that has a minimum evaluation score.

4. The method of claim 1, wherein selecting the at least one snapshot comprises:
   in response to determining that a data retention first policy is enabled, determining at least one snapshot of the plurality of snapshots that has a maximum evaluation score.

5. A device for managing a storage system, comprising:
   a processing unit;
   a memory coupled to the processing unit and comprising instructions stored thereon, the instructions, when executed by the processing unit, causing the apparatus to perform acts comprising:
   determining, for each of a plurality of snapshots, a plurality of blocks referenced by that snapshot;
   determining, for each of the plurality of snapshots, an evaluation score indicating an impact that deletion of that snapshot has on space release and data retention based on at least one of: a reference count for the plurality of blocks referenced by that snapshot, a size of a storage resource associated with that snapshot, and the number of blocks of the plurality of blocks referenced by that snapshot that are referenced only once, wherein the evaluation score of each of the plurality of snapshots is:
   (a) positively correlated with a sum of reference counts for the plurality of blocks referenced by that snapshot and
   (b) negatively correlated with the number of the blocks referenced by that snapshot that are referenced only once and the size of the storage resource associated with that snapshot; and
   selecting at least one snapshot to be deleted from the plurality of snapshots based on respective evaluation scores of the plurality of snapshots.

6. The device of claim 5, wherein determining the plurality of blocks comprises sampling that snapshot to determine the plurality of blocks.

7. The device of claim 5, wherein selecting the at least one snapshot comprises:
   in response to determining that a free space first policy is enabled, determining at least one snapshot of the plurality of snapshots that has a minimum evaluation score.

8. The device of claim 5, wherein selecting the at least one snapshot comprises:
   in response to determining that a data retention first policy is enabled, determining at least one snapshot of the plurality of snapshots that has a maximum evaluation score.

9. A computer program product having a non-transitory computer readable medium which stores a set of instructions to manage a storage system; the set of instructions, when carried out by computerized circuitry, causing the computerized circuitry to perform a method of:
   determining, for each of a plurality of snapshots, a plurality of blocks referenced by that snapshot;
   determining, for each of the plurality of snapshots, an evaluation score indicating an impact that deletion of that snapshot has on space release and data retention based on at least one of: a reference count for the plurality of blocks referenced by that snapshot, a size of a storage resource associated with that snapshot, and the number of blocks of the plurality of blocks referenced by that snapshot that are referenced only once, wherein the evaluation score of each of the plurality of snapshots is:
   (a) positively correlated with a sum of reference counts for the plurality of blocks referenced by that snapshot and
   (b) negatively correlated with the number of the blocks referenced by that snapshot that are referenced only once and the size of the storage resource associated with that snapshot; and
   selecting at least one snapshot to be deleted from the plurality of snapshots based on respective evaluation scores of the plurality of snapshots.

10. The computer program product of claim 9, wherein determining the plurality of blocks comprises sampling that snapshot to determine the plurality of blocks.

11. The computer program product of claim 9, wherein selecting the at least one snapshot comprises:
    in response to determining that a free space first policy is enabled, determining at least one snapshot of the plurality of snapshots that has a minimum evaluation score.

12. The computer program product of claim 9, wherein selecting the at least one snapshot comprises:
    in response to determining that a data retention first policy is enabled, determining at least one snapshot of the plurality of snapshots that has a maximum evaluation score.

* * * * *